(12) United States Patent
Kumar Agrawal

(10) Patent No.: US 11,765,157 B2
(45) Date of Patent: *Sep. 19, 2023

(54) SENDING VERIFICATION PASSWORD RESPONSIVE TO MOBILE DEVICE PROXIMITY

(71) Applicant: Motorola Mobility LLC, Chicago, IL (US)

(72) Inventor: Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,983

(22) Filed: Aug. 12, 2022

(65) Prior Publication Data

US 2022/0385650 A1 Dec. 1, 2022

Related U.S. Application Data

(63) Continuation of application No. 17/159,216, filed on Jan. 27, 2021, now Pat. No. 11,509,648, which is a (Continued)

(30) Foreign Application Priority Data

Jun. 29, 2017 (IN) .............................. 201731022873

(51) Int. Cl.
*H04L 9/40* (2022.01)
*H04W 12/63* (2021.01)

(52) U.S. Cl.
CPC .......... *H04L 63/083* (2013.01); *H04L 63/107* (2013.01); *H04W 12/63* (2021.01)

(58) Field of Classification Search
CPC ... H04W 12/043; H04W 12/60; H04W 12/61; H04W 12/63; H04W 12/65; H04W 12/68;
(Continued)

(56) References Cited

U.S. PATENT DOCUMENTS 7,606,560 B2 10/2009 Labrou
7,784,684 B2 8/2010 Labrou
(Continued)

OTHER PUBLICATIONS

Blackman, James , "New Kid on the IoT Block—Fine-Ranging with UWB and What it Means for IoT", Article published on Enterprise for Insights Jul. 8, 2020 viewed at https://enterpriseiotinsights.com/20200708/channels/fundamentals/fine-ranging-with-uwb-and-what-it-means-for-iot.
(Continued)

*Primary Examiner* — Minh Dinh
(74) *Attorney, Agent, or Firm* — Philip H. Burrus, IV

(57) ABSTRACT

A method includes detecting proximity between a mobile device and a remote device associated with a transaction reserved by a user of the mobile device and a mode of the electronic device. A verification password is sent to the remote device responsive to detecting the proximity and the mode. A device includes a module to detect proximity between the device and a remote device associated with a transaction reserved by a user of the device occurring within a predefined distance threshold and a processor coupled to the module. A device includes another module to detect a stationary mode of the electronic device occurring for at least a predefined duration threshold. The processor is sends a verification password to the remote device responsive to detecting the proximity and the mode.

20 Claims, 4 Drawing Sheets

Related U.S. Application Data continuation-in-part of application No. 15/993,998, filed on May 31, 2018, now Pat. No. 10,477,813.

(58) Field of Classification Search
CPC ...... H04W 4/023; H04W 4/80; G06Q 20/327; G06Q 20/3278; G06Q 20/401; G06Q 20/4012; G06Q 20/4015
See application file for complete search history.

(56) References Cited

U.S. PATENT DOCUMENTS

| | | |
|---|---|---|
| 8,646,060 B1 | 2/2014 | Ben Ayed |
| 8,881,977 B1 | 11/2014 | Paczkowski et al. |
| 2013/0073467 A1 | 3/2013 | Underwood |
| 2013/0159185 A1 | 6/2013 | Lee |
| 2015/0382195 A1 | 12/2015 | Grim et al. |

OTHER PUBLICATIONS

Dinh, Minh, "Non-Final Office Action", U.S. Appl. No. 15/993,988, filed May 31, 2018; dated May 29, 2020.

SENDING VERIFICATION PASSWORD RESPONSIVE TO MOBILE DEVICE PROXIMITY

CROSS REFERENCE TO PRIOR APPLICATIONS

This application is a continuation application claiming priority and benefit under 35 U.S.C. § 120 from U.S. application Ser. No. 17/159,216, filed Jan. 27, 2021, which is a continuation-in-part application claiming priority and benefit under 35 U.S.C. § 120 from U.S. application Ser. No. 15/993,988, filed May 31, 2018, each of which is incorporated by reference for all purposes. U.S. Ser. No. 15/993,988 claims priority to Indian Patent Application Ser. No. 201731022873, filed Jun. 29, 2017.

BACKGROUND

Field of the Disclosure

The disclosed subject matter relates generally to mobile computing systems and, more particularly, to the sending of a verification password responsive to mobile device proximity.

Description of the Related Art

Mobile devices are being increasingly used to handle commercial transactions without the need for separate credit card or other payment processing. In some instances, verification passwords are employed to provide an additional level of identity security. For example, a user may transact for transportation using an application on the mobile device. When completing the reservation, the user may be provided with a verification password, such as a one-time password (OTP). Upon entering the vehicle, the user may orally communicate the verification password to the driver, who enters the verification password into a different mobile device, thereby verifying the identity of the passenger and initiating the service. Upon completion of the transportation service, the rider is automatically billed in accordance with the previously registered payment arrangements. Thus, the user may reserve and complete the transport service without the need to manage separate payment arrangements. The use of the verification password provides additional security for the passenger, as it verifies that the transportation service was properly handled. One potential inconvenience with the use of verification passwords in this context is that it requires the rider to access the mobile device to retrieve the password, preventing the user from employing the device for a call or other activity.

Another type of service that may employ a verification password is a delivery service. When a user transacts for a delivery, a verification password is provided. When the delivery is made, the user may provide the verification password to the delivery person, thereby authenticating the transaction. This approach also provides additional security for both the individual ordering the delivery and the delivery vendor, as the user's identity and delivery location are verified. However, such an approach may be inconvenient for the user as the mobile device would have to be accessed to search for the authentication password. The transaction for the goods being delivered may be conducted hours, days, or even weeks prior to the actual delivery. It may be difficult for the user to locate the verification password in the mobile device at the time of delivery. In some instances, the user may have inadvertently deleted the message containing the verification password, causing additional delay and inconvenience for the user, as the delivery service may have to be contacted to retrieve the verification password or to generate a new one.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

FIGS. 1-4 illustrate example techniques for automatically processing verification passwords for a user of a mobile device. In some embodiments, device context information such as location, travel mode, proximity to another mobile device, etc. may be employed to verify that the user is engaging in a previously contracted point-of-service (POS) transaction associated with a verification password (e.g., a one-time password (OTP)). For example, the POS transaction may be associated with a transportation service (e.g., taxi or ride sharing). The use of the verification password helps to ensure both proper service and proper billing. The verification password may be, for instance, required for the billing process, thereby ensuring an unscrupulous operator does not bill the customer without first providing the service. The verification password may be communicated from the mobile device of the user to a service provider automatically based on the context information. In some embodiments, the user may contract for a time window transaction having an associated verification password. For example, a time window transaction may include a delivery transaction. The verification password and an expected service completion window may be extracted from a document associated with the time window transaction, and the verification password may be automatically displayed on the mobile device proximate the service completion window.

Figure 1:
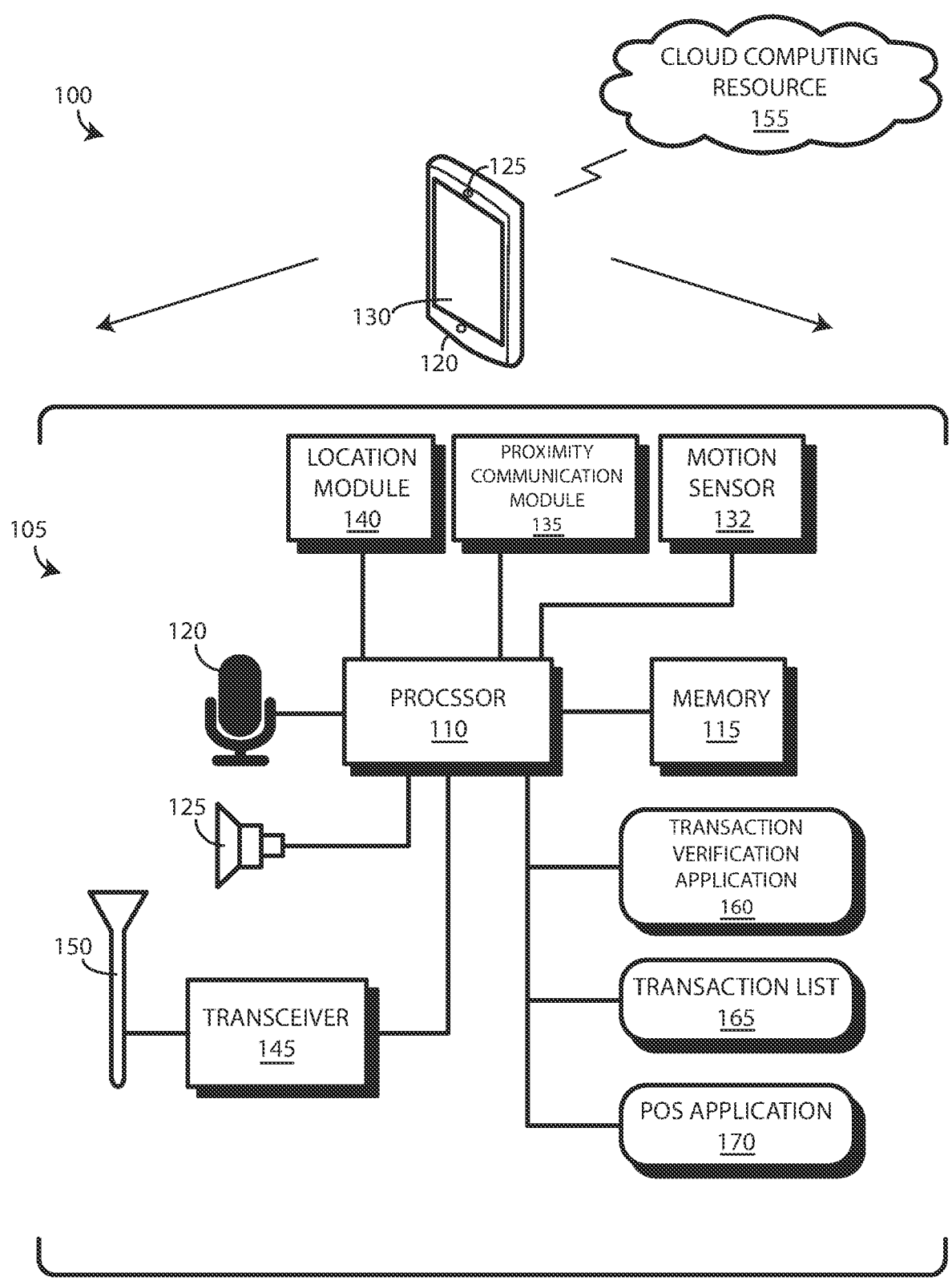
FIG. 1 is a simplified block diagram of a mobile device operable for automatically communicating or displaying verification passwords, according to some embodiments disclosed herein.

FIG. 1 is a simplistic block diagram of a device 100. The device 100 implements a computing system 105 including, among other things, a processor 110, a memory 115, a microphone 120, a speaker 125, a display 130, a motion sensor 132 (e.g., accelerometer, magnetometer, mercury switch, gyroscope, compass, or some combination thereof), a proximity communication module 135 (e.g., a radio frequency identification (RFID) module, an ultra wide band (UWB) module, a near field communication (NFC) module, and so forth), and a location module 140 (e.g., global positioning system (GPS) module, Wi-Fi location module, etc.). The proximity communication module 135 can include a combination of sensors to detect proximity, e.g., a combination of a Wi-Fi module, a Bluetooth® module, and a UWB module, which collectively are referred to as a sensor hub. The use of a combination of sensors can allow for a more granular proximity determination. Thus, in one or more embodiments the proximity communication module 135 includes a sensor hub comprising a Bluetooth® module and a Wi-Fi module in combination with a UWB module. Other combinations of modules suitable for a sensor hub will be obvious to those of ordinary skill in the art having the benefit of this disclosure.

The proximity communication module 135 can, such as when configured as a UWB module, have a range of up to one hundred and fifty meters while precisely determining the proximity of another object with the device 100 with an accuracy of within thirty centimeters. The memory 115 may be a volatile memory (e.g., DRAM, SRAM) or a non-volatile memory (e.g., ROM, flash memory, hard disk, etc.). The device 100 includes a transceiver 145 for transmitting and receiving signals via an antenna 150 over a communication link. The transceiver 145 may include one or more radios for communicating according to different radio access technologies, such as cellular, Wi-Fi, Bluetooth®, etc. The communication link may have a variety of forms. In some embodiments, the communication link may be a wireless radio or cellular radio link. The communication link may also communicate over a packet-based communication network, such as the Internet. In one embodiment, a cloud computing resource 155 may interface with the device 100 to implement one or more of the functions described herein.

In various embodiments, the device 100 may be embodied in a handheld or wearable device, such as a laptop computer, a handheld computer, a tablet computer, a mobile device, a telephone, a personal data assistant, a music player, a game device, a wearable computing device and the like. To the extent certain example aspects of the device 100 are not described herein, such example aspects may or may not be included in various embodiments without limiting the spirit and scope of the embodiments of the present application as would be understood by one of skill in the art.

In the device 100, the processor 110 may execute instructions stored in the memory 115 and store information in the memory 115, such as the results of the executed instructions. Some embodiments of the processor 110 and the memory 115 may be configured to implement a transaction verification application 160. The transaction verification application 160 performs various functions to identify and track verification passwords associated with transactions contracted by a user of the device 100. The transaction verification application 160 may maintain a transaction list 165 identifying point-of-service (POS) or time window transactions contracted by the user of the device 100. The transaction verification application 160 may automatically extract the information for the transactions from applications (e.g., a POS application 170 for contracting transportation services) executed on the device 100, messages received on the device 100 (e.g., email or text), or web documents (e.g., web pages) viewed on the device 100.

Figure 2:
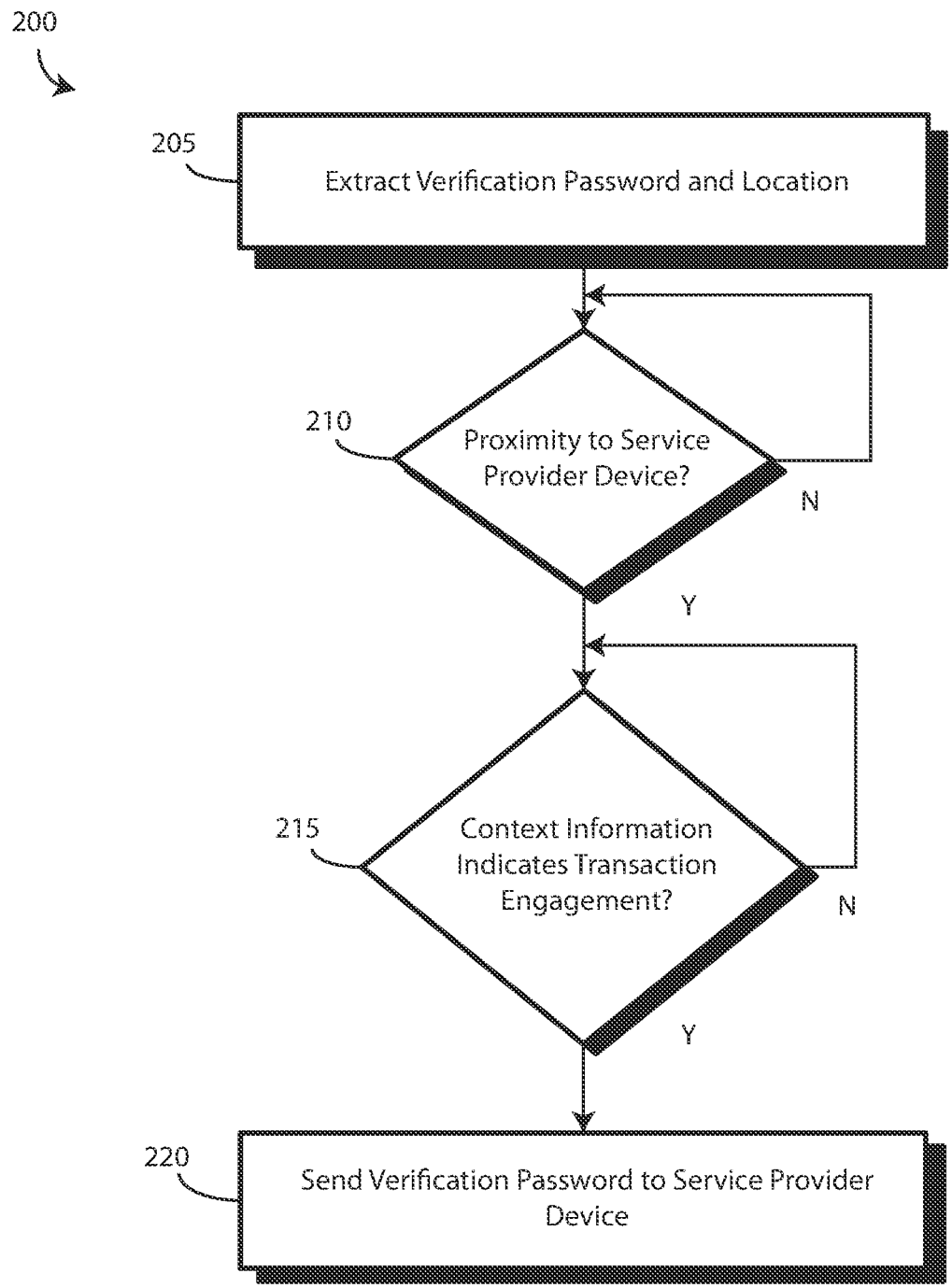
FIG. 2 is a simplified flow diagram of a method for communicating a verification password based on mobile device proximity, according to some embodiments disclosed herein.

FIG. 2 is a simplified flow diagram of a method 200 for communicating a verification password based on mobile device proximity, according to some embodiments disclosed herein. In the example illustrated in FIG. 2, the transactions may be POS transactions, such as transportation services.

In method block 205, the transaction verification application 160 extracts transaction information, including a verification password and a transaction location. The transaction verification application 160 may store the extracted information in the transaction list 165. In some embodiments, the user may execute the POS application 170 to contract for the POS service. In some embodiments, the transaction verification application 160 may interface with the POS application 170 to receive the transaction details, or it may be integrated into the POS application 170. In some embodiments, the transaction verification application 160 may extract the transaction details from documents associated with the transaction. For example, the transaction may be completed using a web page, or the service provider may send transaction details via email or text message. As used herein, the term document refers to a web page, email message, or text message received by the device 100 associated with the transaction.

In method block 210, the transaction verification application 160 detects proximity to a remote device operated by the service provider. In some embodiments, the proximity may be determined using device context information such as the device location information provided by the location module 140 (see FIG. 1). The device location may be compared to the transaction location (e.g., pickup location) to determine proximity. In some embodiments, the device 100 may communicate with the service provider device to indicate proximity. For example, the device 100 may communicate to the service provider device using UWB, RFID, or NFC communication via the proximity communication module 135 (see FIG. 1) to determine that the proximity of the device 100 and the remote device operated by the service provider is within a predefined distance threshold, one example of which is two meters or less. In one or more embodiments, the predefined distance is one meter for instance. The proximity communication module 135 may, using UWB for example, determine that the device 100 is within a predefined distance threshold, such as two meters, one meter, or less than one meter, while the motion sensor 132 determines that the device 100 has been at a stationary location, e.g., not with a user while walking, running, biking, etc., for at least a predefined duration threshold, such as one minute, thirty seconds, fifteen seconds, and so forth. The proximity communication module 135 of the device 100 may read a UWB tag, RFID tag, or other readable object associated with the service provider device. The proximity communication may also be linked to the device location, service provider device location, mobile device motion, and transaction location in that the transaction verification application 160 may search, optionally within a predefined distance threshold, for the service provider device when the device 100 is in the transaction location, and optionally when the device 100 has been stationarily situated within the transaction for at least a predefined duration threshold.

In some embodiments, the device 100 may employ additional context data in addition to the location data. As noted above, a combination of proximity threshold and stationary duration threshold can be used in conjunction with, or separate from, location information. For example, the device 100 may communicate to the service provider device using UWB, RFID, or NFC communication via the proximity communication module 135 (see FIG. 1) to determine that the proximity of the device 100 and the remote device operated by the service provider is within a predefined distance threshold, such as two meters or less. The proximity communication module 135 can determine that the device 100 is within a predefined distance threshold, such as about one meter, while the motion sensor 132 determines that the device 100 has been stationary with reference to location for at least a predefined duration threshold, such as one minute, thirty seconds, fifteen seconds, and so forth. These two measurements can be used in combination, both in conjunction with, or independent of, transaction location. In method block 215, the transaction verification application 160 determines whether context information associated with the device 100 indicates transaction engagement. This additional context information may provide assurance not only that the user is near the service provider, but that the user has also engaged in the transaction. This additional context information may also provide assurance not only that the user is within a predefined distance threshold less than two meters, such as one meter, of the service provider, but also that the user has been stationary at that location for at least a predefined duration threshold, such as thirty seconds. If only location information were employed, the driver could drive off without the passenger and still appear to complete the transaction.

In one embodiment, the context information includes a motion mode of the device 100. For example, the device 100 may identify modes of the device 100 such as walking, stationary, driving, etc. The device 100 may identify such a mode of the device 100, such as being stationary, occurring for at least a predefined duration of time, such as one minute, thirty seconds, fifteen seconds, ten seconds, and so forth. The device 100 may use motion data from the motion sensor 132 to determine the mode. The device 100 may use motion data from the motion sensor 132 in conjunction with an onboard clock and/or timer of the processor 110 to determine the mode occurring for at least a predefined duration threshold. The transaction verification application 160 may verify the transaction engagement in method block 215 based on a transition from a walking mode to a driving mode. The transaction verification application 160 may verify the transaction engagement in method block 215 based upon the device 100 being stationary for at least a predefined duration threshold.

In one embodiment, the context information includes the device 100 being situated within a predefined distance threshold less than two meters, such as one meter, of a service provider device. In addition to, or without consideration of, the device 100 and the service provider device being at a common location, the device 100 may employ the proximity communication module 135 to detect the device 100 being within the predefined threshold distance of the service provider device. The transaction verification application 160 may verify the transaction engagement in method block 215 based upon the device 100 being within the predefined distance threshold.

In one embodiment, the context information includes a noise profile of the device 100. For example, the device 100 may monitor the microphone 120 (see FIG. 1) and compare the current noise profile to a library of reference noise profiles. For example, the noise profile may match an outdoors reference profile if the user is outdoors walking to the transaction location. The noise profile may match a vehicle reference profile if the user is in a vehicle (e.g., less ambient noise). The transaction verification application 160 may verify the transaction engagement in method block 215 based on a transition from an outdoor noise profile to a vehicle noise profile.

In some embodiments, the transaction verification application 160 may evaluate the context information in various combinations. For example, in one embodiment the transaction verification application 160 may evaluate both the motion mode and the noise profile in method block 215. In other embodiments, the transaction verification application 160 may evaluate both the stationary mode and the distance threshold in method block 215. In still other embodiments, the transaction verification application 160 may evaluate the stationary mode for the predefined duration threshold and the proximity between device and service provider device being within the predefined distance threshold in method block 215 such that a verification password is only transferred when it is confirmed that the device 100 and a service provider device are within, say, one meter of each other with the device 100 being stationary at that location for, say, at least thirty seconds. Other combinations of context information suitable for evaluation in method block 215 will be obvious to those of ordinary skill in the art having the benefit of this disclosure.

Upon identifying transaction engagement in method block 215, the transaction verification application 160 sends the verification password to the service provider device in method block 220. The verification password may be sent via text message, by the POS application 170, via peer-to-peer message, via audio message (e.g., audible or encoded), via infrared message, etc.

Automatically extracting the verification password and providing it to the service provided based on device context (e.g., location, motion mode, noise profile, etc.) greatly simplifies the process the user employs to complete the transaction. The user does not have to interact with the device 100 to find the verification password or interrupt other uses of the device 100. When the transaction is engaged, the verification password is automatically communicated to the service provider.

Figure 3:
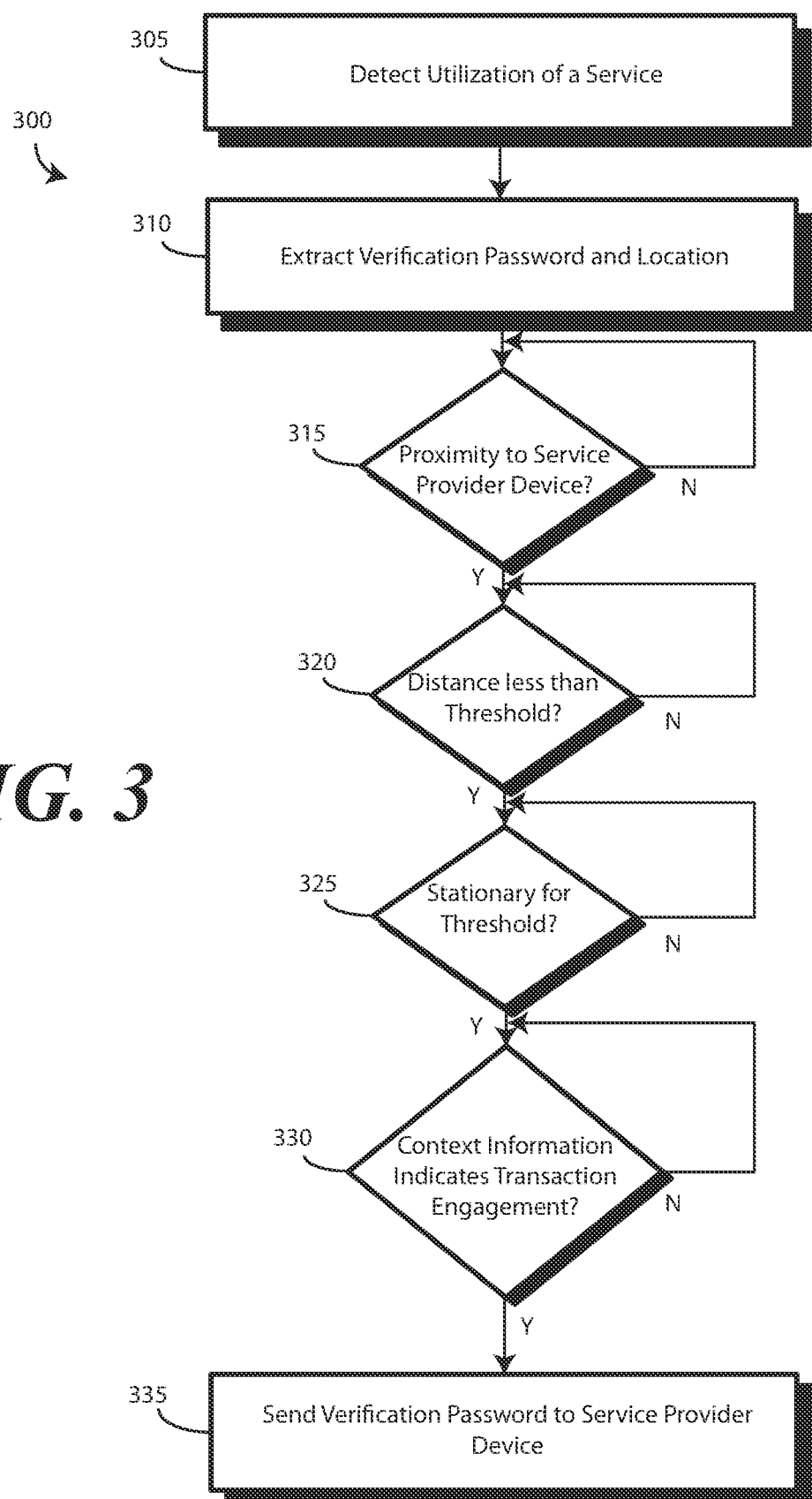
FIG. 3 is a simplified flow diagram of a method for displaying a verification password based on a mode and proximity of an electronic device, according to some embodiments disclosed herein.

FIG. 3 is a simplified flow diagram of a method 300 for communicating a verification password based on mobile device proximity being within a predefined distance threshold of a service provider device while being stationary for at least a predefined duration threshold, according to some embodiments disclosed herein. In the example illustrated in FIG. 3, the transactions may be POS transactions, such as transportation services.

In method block 305, the transaction verification application 160 detects that a user of a device 100 is utilizing a service, such as a transportation service or delivery service. In method block 305 the transaction verification application 160 detects this by detecting the scheduling of a request for service requiring a verification password to be transmitted to a service provider. Other techniques for the transaction verification application 160 to detect service utilization can be used at method block 305. For example, in some embodiments the user may execute the POS application 170 to contract for the POS service. In some embodiments, the transaction verification application 160 may interface with the POS application 170 to receive the transaction details, or it may be integrated into the POS application 170. In some embodiments, in method block 305 the transaction verification application 160 can detect that a user is utilizing a transportation service where, on boarding the service provider transportation device, the device 100 will be required to transfer a verification password to a service provider device at the service provider transportation device prior to initiation of the service commencing. For example, the transaction may be completed using a web page, or the service provider may send transaction details via email or text message.

At method block 310, the transaction verification application 160 extracts transaction information, as previously described. The transaction information can include one or more of a verification password, a predefined duration threshold during which the device 100 must be stationary, a predefined distance threshold within which the device 100 must be from a service provider device, and a transaction location. The transaction verification application 160 may store the extracted information in the transaction list 165. In some embodiments, the transaction verification application 160 may extract the transaction details from documents associated with the transaction that are received by the device 100 associated with the transaction.

In method block 315, the transaction verification application 160 detects proximity to a remote device operated by the service provider. In some embodiments, the proximity may be determined using service provider device context information such as when the service, provider arrives at a transaction location collocated with the device 100 or within a predefined distance threshold of the device 100. In method block 315, the transaction verification application 160 may also, optionally utilizing the proximity communication module 135, location module 140, and/or motion sensor 132, that the device 100 is approaching the location of the service provider device and/or that the device 100 has reached the location of the service provider device. The proximity may be determined using device context information such as the device location information provided by the location module 140. The device location may be compared to the transaction location (e.g., pickup location) to determine proximity.

In method block 320, the transaction verification application 160, optionally utilizing the proximity communication module 135, detects that the device is within a predefined distance threshold, such as one meter, of the service provider device. In some embodiments, the device 100 may communicate with the service provider device to confirm proximity within the predefined distance threshold. For example, the device 100 may communicate to the service provider device using UWB communication via the proximity communication module 135 to determine that the proximity of the device 100 and the remote device operated by the service provider is within a predefined distance threshold.

In method block 325, the transaction verification application 160, optionally utilizing an on-board clock or timer of the processor 110, detects that the device 100 has been stationary for at least a predefined duration threshold, such as thirty seconds, twenty seconds, ten seconds, or another predefined duration threshold. Method block 320 and method block 325 can be used in combination. For example, the proximity communication module 135 may use UWB communication to determine that the device 100 is within the predefined distance threshold while the motion sensor 132 determines that the device 100 has been at a stationary location for at least the predefined duration threshold. The use of a combination of the proximity distance threshold and the stationary duration threshold advantageously utilizes the granularity of location accuracy offered by the proximity communication module 135, especially when equipped with a UWB module, to solve the situation of seamlessly delivering a verification password from the device 100 to a service provider vice responsive to detecting this proximity.

The proximity communication may also be linked to the device location, service provider device location, mobile device motion, and transaction location in that the transaction verification application 160 may search, optionally within a predefined distance threshold, for the service provider device when the device 100 is in the transaction location, and optionally when the device 100 has been stationary within the transaction for at least a predefined duration threshold.

In some embodiments, the device 100 may employ additional context data in addition to the location data in optional method block 330. Any of the context data described above with reference to the method 200 of FIG. 2 could be used accordingly, alone or in combination, with the method 300 of FIG. 3 in optional method block 330. For example, a combination of a motion mode of the device 100 where the device 100 transitions from a walking mode to a seated and/or riding mode, and a noise profile of the device 100 where a noise profile matching an outdoors reference profile transitions to a vehicle reference profile with less ambient noise may be determined in optional method block 330. The transaction verification application 160 may verify the transaction engagement in optional method block 330 based upon the combination of context data considered.

In method block 335, the transaction verification application 160 sends the verification password to the service provider device. The verification password may be sent via text message, by the POS application 170, via peer-to-peer message, via audio message (e.g., audible or encoded), via infrared message, etc. Automatically extracting the verification password and providing it to the service provided based on device context (e.g., being within a predefined distance threshold of a service provider device and having been stationary for a predefined duration threshold, etc.) greatly simplifies the process the user employs to complete the transaction. The user does not have to interact with the device 100 to find the verification password or interrupt other uses of the device 100. When the transaction is engaged, the verification password is automatically communicated to the service provider.

Figure 4:
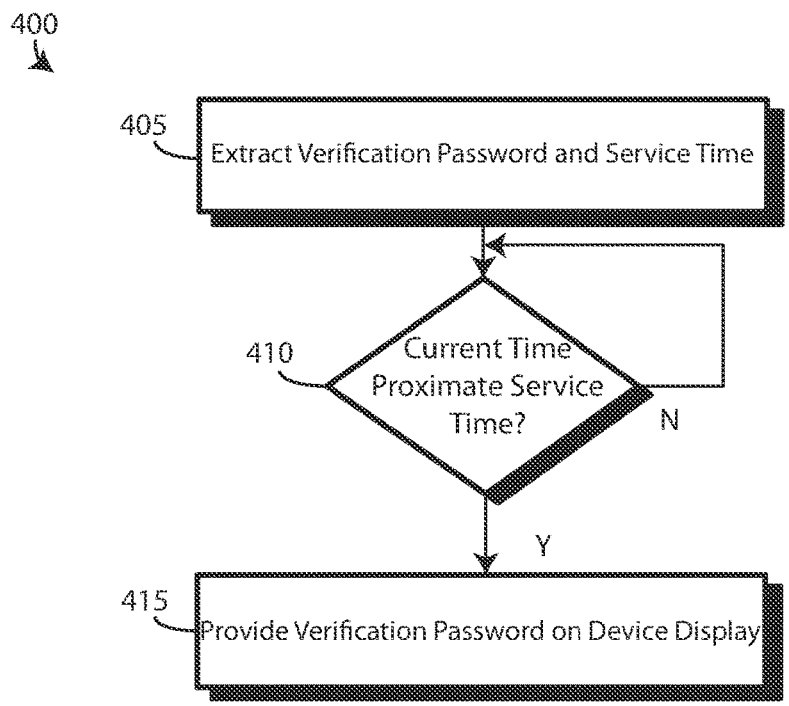
FIG. 4 is a simplified flow diagram of a method for displaying a verification password based on expected appointment time window, according to some embodiments disclosed herein.

FIG. 4 is a simplified flow diagram of a method 400 for retrieving a verification password based on expected appointment time window, according to some embodiments disclosed herein. In the example illustrated in FIG. 4, the transactions may be time transactions, such as delivery services.

In method block 405, the transaction verification application 160 extracts transaction information, including a verification password and a service time. The transaction verification application 160 may store the extracted information in the transaction list 165. In some embodiments, the transaction verification application 160 may extract the transaction details from documents associated with the transaction. For example, the transaction may be completed using a web page, or the service provider may send transaction details via email or text message. As used herein, the term document refers to a web page, email message, or text message received by the device 100 associated with the transaction.

In some embodiments, the transaction verification application 160 may update the expected service time based on new information received in the device 100 (e.g., text message, emails, etc.) indicating a more accurate service time, a change to the service time, etc.

In method block 410, the transaction verification application 160 determines that the current time is proximate the service time. For example, transaction verification application 160 may determine that the current time is within a particular time window relative to the expected service time. The size of the time window may depend on the information extracted regarding the transaction. If the service provider indicates only a particular day for the service, the time window may be the associated day. If a more refined time window is provided, a shorter time window may be employed. The time window may also be updated based on updates provided by the service provider on the service time.

The transaction verification application 160 provides the verification password on the display 130 in method block 415 responsive to detecting service time proximity in method block 410. In some embodiments, the transaction verification application 160 may send a notification message to the user.

Figure 5:
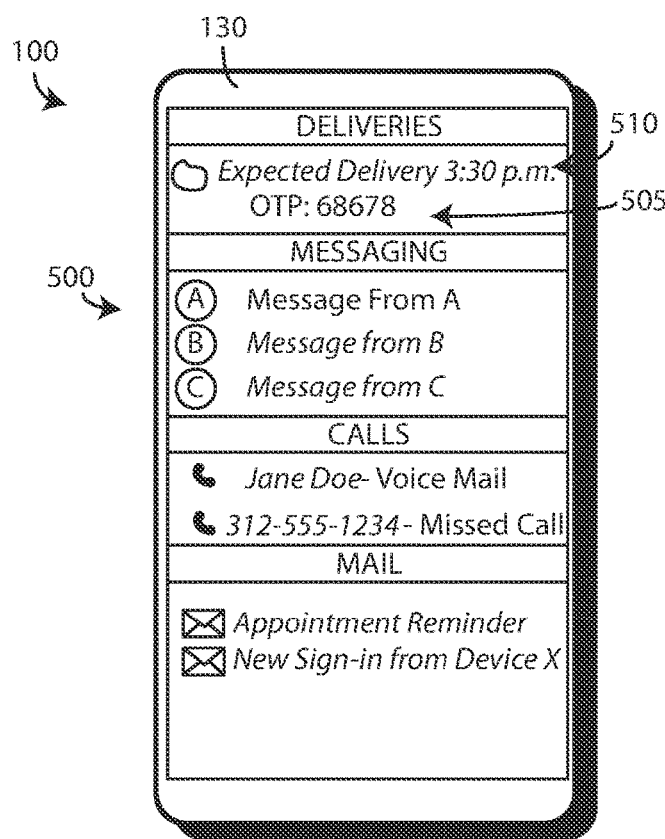
FIG. 5 is a front view of the device of FIG. 1 illustrating an example notification list that includes a verification password and expected service time, according to some embodiments disclosed herein.

FIG. 5 is a front view of the device 100 of FIG. 1 illustrating an example notification list 500. The notification list 500 includes the verification password 505 and the expected service time 510. The notification list 500 may also include additional notification information, such as recent messages, calls, mail, etc. The notification list 500 may be provided in a low power AoD state, where the device 100 is locked and full functionality is not present. In such a state, the functionality of the device 100 may be limited (e.g., receiving calls or messages, and providing status information on the display 130). The user simply has to look at the display during the service time window or when the delivery arrives to see the verification password. The user does not have to unlock the device 100 or search for the transaction to retrieve the verification password. In some embodiments, the notification list including the verification password may also be provided in a fully-active mode of the device 100.

Providing the verification password on the display 130 proximate the service time greatly simplifies the process the user employs to complete the transaction. The user does not have to interact with the device 100 to find the verification password or other details of the transaction. When the appropriate time period arrives, the user is provided with the associated verification password.

A method provided detects proximity between a mobile device and a remote device associated with a transaction reserved by a user of the mobile device, detects a stationary mode of the mobile device at a location where proximity between the mobile device and the remote device is detected, extracts a verification password from a document on the mobile device associated with the transaction, and sends the verification password to the remote device responsive to detecting both the proximity and the stationary mode.

A device provided includes a first module detecting proximity between the device and a remote device associated with a transaction reserved by a user of the device, a second module detecting a stationary mode of the device, and a processor operable with the first module and the second module, wherein the processor extracts a verification password associated with the transaction from a document associated with the transaction stored on the mobile device and sends the verification password to the remote device responsive to detecting the proximity and the stationary mode.

Another method provided detects proximity between a mobile device and a remote device associated with a transaction reserved by a user of the mobile device occurring within a predefined distance threshold, detects a stationary mode of the mobile device occurring for at least a predefined duration threshold at a location where proximity between the mobile device and the remote device is detected, and sends a verification password to the remote device responsive to detecting the proximity occurring within the predefined distance threshold and the stationary mode occurring for at least the predefined duration threshold at the location.

In some embodiments, certain aspects of the techniques described above may be implemented by one or more processors of a processing system executing software. The techniques described herein may be implemented by executing software on a computing device, such as the processor 110 of FIG. 1, however, such methods are not abstract in that they improve the operation of the device 100 and the user's experience when operating the device 100. Prior to execution, the software instructions may be transferred from a non-transitory computer readable storage medium to a memory, such as the memory 115 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
 detecting proximity between a mobile device and a remote device associated with a transaction reserved by a user of the mobile device;
 detecting a stationary mode of the mobile device at a location where proximity between the mobile device and the remote device is detected; and
 sending a verification password to the remote device responsive to detecting both the proximity and the stationary mode.

2. The method of claim 1, wherein the detecting the proximity comprises detecting the proximity between the mobile device and the remote device being within a distance threshold.

3. The method of claim 2, wherein the detecting the stationary mode comprises detecting the stationary mode occurring for at least a duration threshold.

4. The method of claim 3, wherein the sending the verification password to the remote device occurs only when the proximity is within the distance threshold and the stationary mode occurs for at least the duration threshold.

5. The method of claim 4, wherein the distance threshold is two meters or less.

6. The method of claim 1, wherein detecting the proximity further comprises:
 detecting a first location of the mobile device;
 receiving a second location associated with the transaction in the mobile device; and
 comparing the first and second locations to determine the first location is collocated with the second location.

7. The method of claim 1, wherein detecting the proximity further comprises detecting context information associated with the mobile device indicative of transaction engagement.

8. The method of claim 7, wherein detecting the context information comprises detecting a transition between a walking mode of the mobile device and the stationary mode of the mobile device.

9. The method of claim 7, wherein detecting the context information further comprises:
 monitoring a current noise profile of the mobile device; and
 comparing the current noise profile to at least one reference noise profile associated with the transaction.

10. The method of claim 1, wherein the verification password comprises one of a web document, a text message, or an email message.

11. A device, comprising:
 a first module detecting proximity between the device and a remote device associated with a transaction reserved by a user of the device;
 a second module detecting a stationary mode of the device; and
 a processor operable with the first module and the second module, wherein the processor sends a verification password to the remote device responsive to detecting the proximity and the stationary mode.

12. The device of claim 11, the first module detecting the proximity between the device and the remote device being within a distance threshold.

13. The device of claim 12, the second module detecting the stationary mode of the device occurring for at least a duration threshold.

14. The device of claim 13, further comprising a third module detecting a location of the device, wherein the processor detects location associated with the transaction to determine the stationary mode occurs at the location associated with the transaction.

15. The device of claim 11, wherein the first module comprises a proximity communication module communicating with the remote device to determine proximity to the remote device.

16. The device of claim 15, the proximity communication module comprising an ultra wide band (UWB) module.

17. The device of claim 11, wherein the processor detects context information associated with the device indicative of transaction engagement and sends the verification password to the remote device further responsive to the context information.

18. A method, comprising:
 detecting proximity between a mobile device and a remote device associated with a transaction reserved by a user of the mobile device;
 detecting a stationary mode of the mobile device occurring at a location where proximity between the mobile device and the remote device is detected; and
 sending a verification password to the remote device responsive to detecting the proximity and the stationary mode occurring.

19. The method of claim 18, further comprising detecting context information associated with the mobile device indicative of transaction engagement by detecting a transition between a walking mode of the mobile device and a stationary mode of the mobile device.

20. The method of claim 18, wherein the sending comprises sending a text message.

* * * * *